US010521379B1

(12) United States Patent
Callison et al.

(10) Patent No.: US 10,521,379 B1
(45) Date of Patent: Dec. 31, 2019

(54) SYSTEMS AND METHODS FOR I/O PRIORITIZATION IN NVME-COMPLIANT STORAGE DEVICES

(71) Applicant: HEWLETT PACKARD ENTERPRISE DEVELOPMENT LP, Houston, TX (US)

(72) Inventors: Rachel Callison, Roseville, CA (US); Robert R Brodeur, Auburn, CA (US); Robert Tappan, Antelope, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/131,002

(22) Filed: Sep. 13, 2018

(51) Int. Cl.
*G06F 13/36* (2006.01)
*G06F 13/362* (2006.01)
*G06F 1/20* (2006.01)

(52) U.S. Cl.
CPC .......... *G06F 13/3625* (2013.01); *G06F 1/206* (2013.01)

(58) Field of Classification Search
None
See application file for complete search history.

(56) References Cited

U.S. PATENT DOCUMENTS

| | | | | |
|---|---|---|---|---|
| 5,986,357 A * | 11/1999 | Myron | ............... | G06K 9/00335 307/116 |
| 6,580,353 B1 * | 6/2003 | Geber | .................... | B60R 25/04 340/5.6 |
| 6,657,535 B1 * | 12/2003 | Magbie | ................. | B60R 25/102 307/10.1 |
| 8,355,804 B2 | 1/2013 | Gonzalez-Banos | | |
| 9,395,219 B1 | 7/2016 | Dow | | |
| 9,479,948 B2 | 10/2016 | Bandyopadhyay | | |
| 9,715,818 B2 | 7/2017 | Peder | | |
| 9,888,082 B2 | 2/2018 | Lee | | |
| 2007/0078527 A1 * | 4/2007 | Gonzalez-Banos | .... | G08C 17/00 700/19 |
| 2012/0116724 A1 | 5/2012 | Takara | | |

OTHER PUBLICATIONS

Johannes Gehrke, "Query Processing in Sensor Networks," 2004, 10 pages, https://www.cs.cmu.edu/~jasonh/courses/ubicomp-sp2007/papers/26-pervasive04-query-processing-in-sensor-networks.pdf.

* cited by examiner

*Primary Examiner* — Henry Tsai
*Assistant Examiner* — Aurangzeb Hassan
(74) *Attorney, Agent, or Firm* — Hewlett Packard Enterprise Patent Department (57) ABSTRACT

Systems and methods described herein reduce contention on shared buses through which multiple sensors send sensor readings to a computing destination by allowing different query rates for each sensor and dynamically adjusting the query rate for each sensor based on the readings that sensor reports. A first query is sent to a sensor via a bus to request a current sensor reading from the sensor. In response to the first query, the sensor sends the current sensor reading via a bus. A function of the current sensor reading, a predefined time range, and a predefined reading-value range is evaluated to determine a time interval between the first query and a second query to be sent to the sensor. When the amount of time elapsed since the first query was sent matches the time interval, the second query is sent to the sensor via the bus to request an updated sensor reading.

17 Claims, 6 Drawing Sheets

| Time | value$_{current}$ | Δt$_{extrapolated}$ |
|---|---|---|
| 0 | 25 | 60 |
| 60 | 40 | 48.4 |
| 108.4 | 52.1 | 39.04267 |
| 147.4427 | 61.86067 | 31.49442 |
| 178.9371 | 69.73427 | 25.4055 |
| 204.3426 | 76.08565 | 20.49377 |
| 224.8363 | 81.20909 | 16.53164 |
| 241.368 | 85.342 | 13.33552 |
| 254.7035 | 88.67588 | 10.75732 |
| 265.4608 | 91.36521 | 8.677573 |
| 274.1384 | 93.5346 | 6.999908 |
| 281.1383 | 95.28458 | 5.646593 |
| 286.7849 | 96.69623 | 4.554918 |
| 291.3398 | 97.83496 | 3.674301 |
| 295.0141 | 98.75353 | 2.963936 |
| 297.9781 | 99.49452 | 2.390908 |
| 300.369 | 100.0922 | 2 |
| 302.369 | 100.5922 | 2 |
| 304.369 | 101.0922 | 2 |
| 306.369 | 101.5922 | 2 |
| 308.369 | 102.0922 | 2 |
| 310.369 | 102.5922 | 2 |
| 312.369 | 103.0922 | 2 |
| 314.369 | 103.5922 | 2 |
| 316.369 | 103.0922 | 2 |

300B

| Time | value$_{current}$ | Δt$_{extrapolated}$ |
|---|---|---|
| 318.369 | 102.5922 | 2 |
| 320.369 | 102.0922 | 2 |
| 322.369 | 101.5922 | 2 |
| 324.369 | 101.0922 | 2 |
| 326.369 | 100.5922 | 2 |
| 328.369 | 100.0922 | 2 |
| 330.369 | 99.59224 | 2.315333 |
| 332.6843 | 99.01341 | 2.762964 |
| 335.4473 | 98.32267 | 3.297137 |
| 338.7444 | 97.49838 | 3.934583 |
| 342.679 | 96.51474 | 4.695269 |
| 347.3743 | 95.34092 | 5.603021 |
| 352.9773 | 93.94017 | 6.686272 |
| 359.6635 | 92.2686 | 7.978951 |
| 367.6425 | 90.27386 | 9.521548 |
| 377.164 | 87.89347 | 11.36238 |
| 388.5264 | 85.05288 | 13.55911 |
| 402.0855 | 81.6631 | 16.18054 |
| 418.2661 | 77.61797 | 19.30877 |
| 437.5748 | 72.79077 | 23.0418 |
| 460.6166 | 67.03032 | 27.49655 |
| 488.1132 | 60.15619 | 32.81255 |
| 520.9257 | 51.95305 | 39.15631 |
| 560.0821 | 42.16397 | 46.72653 |
| 606.8086 | 30.48234 | 55.76033 |

SYSTEMS AND METHODS FOR I/O PRIORITIZATION IN NVME-COMPLIANT STORAGE DEVICES

BACKGROUND

Many different types of modern mechanical and electrical systems utilize sensors to collect information about the current levels of certain properties where the sensors are located. Some sensors, such as voltage sensors and amperage sensors, are primarily used to measure different types of loads on electrical systems. Other types of sensors, such as smoke detectors, motion sensors, moisture sensors, and carbon monoxide detectors are often used to measure ambient conditions in sections of an environment in which the sensors are disposed. With the advent of the Internet of Things (IoT), large groups of sensors can report measured quantities to a central network location for consolidation and storage. System administrators can use various software tools to visualize and analyze the sensor data.

BRIEF DESCRIPTION OF THE DRAWINGS

Various features and advantages will become apparent from the following description, given by way of example only, which is made with reference to the accompanying drawings, of which.

DETAILED DESCRIPTION

Some types of modern systems (e.g., server farms, IoT systems, or other types of systems) may include vast numbers of sensors distributed across an area of interest. Such sensors may be configured to transmit sensor readings to a network computing destination where processors, memory, and storage are available for collecting and analyzing the sensor-reading data. In some systems, a module executing at the computing destination may be configured to query the sensors periodically to request updated readings.

To retrieve and process the updated sensor readings, systems resources such as the network infrastructure and at least one central processing unit (CPU) are used. If the number of sensors is relatively small, the system load caused by network communications with sensors may be manageable. However, if the number of sensors is large, the load caused by such communications may result in a significant load on system resources. For example, if many sensors are configured to communicate with the computing destination through a single shared bus, frequent bus contention is likely to occur. Such bus contention may lead to high levels of latency. (As used herein, the term "bus" generally refers to hardware that transfers data between components in a computing system or between multiple computing systems.)

In systems that analyze sensor data in real time to identify potentially dangerous conditions that require urgent remediation, high levels of latency may be unacceptable. For example, if a network communication is delayed and the communication includes a sensor reading that indicates the temperature of a sensitive electrical component (e.g., a processor) is too high, a remedial action may be triggered too late to prevent damage to the component.

There are a number of approaches that have been used to alleviate such delays. For example, one approach is to limit the number of sensors that can be queried during each query cycle. If the number of sensors in the system exceeds the limit, at least some sensors will not be queried during each cycle. A round-robin method may be used to determine which subset of sensors to query in each cycle. While this approach may reduce bus contention, information from the sensors that are not queried in a given cycle is still delayed. Since this approach does not have any way of prioritizing which sensors to query in a given cycle, some sensors that have urgent information to report (e.g., a dangerously high or low readings) may be excluded and the reporting of that urgent information may be delayed.

Another approach is to reduce the number of sensors that are to be queried for the system. For example, the number of sensors in a system may be capped. However, if the system is large, the capped number of sensors may be less effective for detecting events of interest within the system. For example, if the number of sensitive components in a system is greater than the number of sensors in the system, some components may not be coupled to sensors at all. Those unmonitored components may fail due to events that could have been detected if a sensor was coupled to each component.

Another approach is to deactivate safety features such as watchdog timers and bus timeouts. However, deactivating safety features leaves the system vulnerable to the types of problems those features were designed to prevent.

Another approach is to provide each sensor with its own device bus. However, this approach increases the cost and complexity of the system. Furthermore, for systems with large numbers of sensors, this approach may be impractical.

Systems and methods described herein provide many advantages over the approaches discussed above. Specifically, systems and methods described herein increase the efficiency of low-speed device bus management, reduce downtime from device-read failures from bus contention, increase the number of sensors that can be used in a system without requiring additional device buses or heavily impacted CPU usage levels, improve system response times for events that can be detected via sensor readings, reduce warranty expenses by not triaging and debugging buses that fail due to resource contention, and prioritizes querying sensors that are observing highly urgent data over sensors that are observing less urgent data. By allowing different query rates for each sensor and dynamically adjusting the query rate for each sensor based on the readings that sensor reports, systems described herein ensure that urgent sensor information is reported promptly so that remedial action is not delayed.

Figure 1:
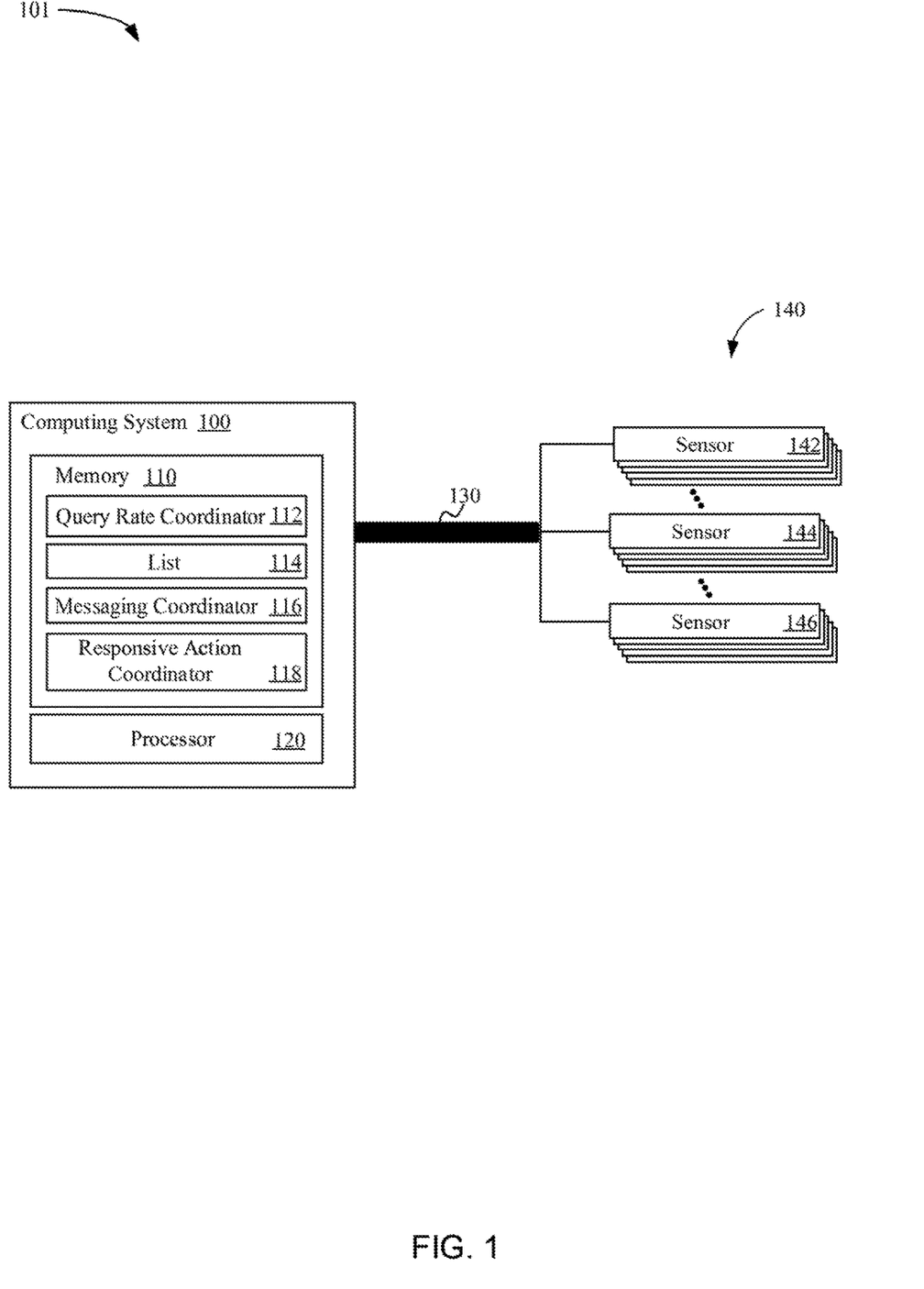
FIG. 1 illustrates an example computing environment in which systems described herein can operate.

FIG. 1 illustrates an example computing environment 101 in which systems described herein can operate. As shown, the computing environment 101 may include a computing system 100. Sensors 140 communicate with the computing system 100 via a shared bus 130 (e.g., a PCIe bus, an I2C bus, or some other type of bus). The sensors 140 comprise sensor 142, sensor 144, and sensor 146, which are shown to facilitate an explanation of how systems described herein may operate. However, persons of skill in the art will understand that the systems described herein may use more sensors (e.g., hundreds, thousands, or more) or fewer sensors (e.g., as few as one) without departing from the spirit and scope of this disclosure.

The sensors 140 are configured to take sensor readings that measure a property of interest over time and report those sensor readings to the computing system 100 via the shared bus 130 in response to queries. In various embodiments, different types of sensors may be used. For example, the sensors 140 may be thermal (e.g., temperature) sensors, voltage sensors, current (e.g., amperage) sensors, motion sensors, light sensors, pressure sensors, infrared sensors, audio sensors (e.g., microphones), or other types of sensors. In some embodiments, the sensors 140 may be part of an Internet-of-Things (IoT) system.

The specific type of sensor used in any particular embodiment will depend on the objectives that embodiment is designed to achieve. In one example, the sensors 140 may be thermal sensors that monitor the temperatures of electronic components (e.g., processors in a server cluster) so that excessive temperatures can be detected and a responsive action (e.g., increasing fan speeds or shutting down components with temperatures that exceed a threshold) can be triggered. In another example, the sensors 140 may be moisture sensors that monitor water levels in soil so that sub-optimal moisture levels can be detected and a responsive action (e.g., activating a garden sprinkler system) can be taken. These examples are merely illustrative. Persons of skill in the art will recognize that may other types of sensors may be used in other examples to monitor other quantitative properties of interest.

The computing system includes a processor 120 and memory 110 (e.g., random access memory, a cache, etc.). The processor 120 executes a query rate coordinator 112 that is stored in the memory 110. The query rate coordinator 112 dynamically determines the rates at which sensor readings will be collected from each of the sensors 140. In the list 114, the sensors 140 are sorted in order of when each sensor is to be queried next. When the query rate coordinator 112 updates the query rate for one of the sensors 140, the query rate coordinator 112 also updates the list 114 to reflect any changes in the order that result from the updated query rate.

The processor 120 also executes the messaging coordinator 116. The messaging coordinator 116 queries the sensors 140 for sensor readings at the query rates determined by the query rate coordinator 112 and in the order reflected by the list 114. In response, the sensors 140 send the requested readings to the messaging coordinator 116. Once a query is sent to one of the sensors 140, the messaging coordinator 116 updates the list to reflect any resulting change in the order in which the sensors 140 are to be queried.

The methodology the query rate coordinator 112 applies to determine the query rates for the sensors 140 is based on the values of sensor readings received from the sensors 140 in response to the queries sent by the messaging coordinator 116. In addition, the methodology for determining the query rates also depends on several additional parameters. Two parameters, $\Delta t_{min}$ and $\Delta t_{max}$, represent a time range for the amount of time that can be allowed to elapse between successive queries to a sensor. Two other parameters, value$_{min}$ and value$_{max}$, represent a reading-value range deemed to be acceptable to an administrator. For example, if the sensors 140 are thermal sensors, the reading-value range may represent the temperature range in which electrical components (e.g., processors) can operate without being damaged. In another example, if the sensors 140 are moisture sensors, the reading-value range may represent optimal moisture levels for crops that are planted in soil in which the sensors 140 are disposed.

One methodology for determining the query rates can be defined as follows. Let $\Delta t_{min}$ represent the smallest amount of time that will be allowed to elapse between two queries to a sensor (i.e., the lower threshold value of the time range). Let $\Delta t_{max}$ represent the largest amount of time that will be allowed to elapse between two queries to a sensor (i.e., the upper threshold value of the time range). Also, let value$_{min}$ define a lower bound (i.e., the lower threshold value) of the reading-value range. Let value$_{max}$ represent an upper bound (i.e., the upper threshold value) of the reading-value range. In some examples, the values of $\Delta t_{min}$, $\Delta t_{max}$, value$_{min}$, and value$_{max}$ can be configured beforehand (e.g., by an administrator through a user interface).

When a sensor reading (represented as value$_{current}$) is received from one of the sensors 140 in response to a current query, the query rate coordinator 112 can calculate the time interval between the current query and the next query (represented as $\Delta t_{extrapolated}$) according to the following equation:

$$\Delta t_{extrapolated} = \Delta t_{max} - \frac{(\text{value}_{current} - \text{value}_{min})}{(\text{value}_{max} - \text{value}_{min})} \times (\Delta t_{max} - \Delta t_{min})$$

When the equation above is used to determine query rates, sensors that report readings closer to the value$_{max}$ are queried more frequently than sensors that report readings that are closer to value$_{min}$.

In some embodiments, the processor 120 also executes the responsive action coordinator 118. When a sensor reading received from one of the sensors 140 satisfies a predefined condition (e.g., by exceeding an upper threshold value or by being lower than a lower threshold value), the responsive action coordinator 118 signals a component associated with that sensor to perform a responsive action. For example, if a sensor reading from sensor 142 indicates that the temperature of a central processing unit (CPU) is too high, the responsive action coordinator 118 may signal that CPU to shut down to avoid overheating. On the other hand, if a sensor reading from sensor 142 indicates that the temperature of the CPU is lower than a threshold, the responsive action coordinator 118 may signal a fan associated with the CPU to reduce its fan speed (e.g., to avoid unnecessary power consumption). In another example, if a sensor reading from sensor 146 indicates that the moisture level of soil in which the sensor 146 is disposed is too low, the responsive action coordinator 118 may signal a sprinkler associated with the sensor to water the soil.

Figure 2:
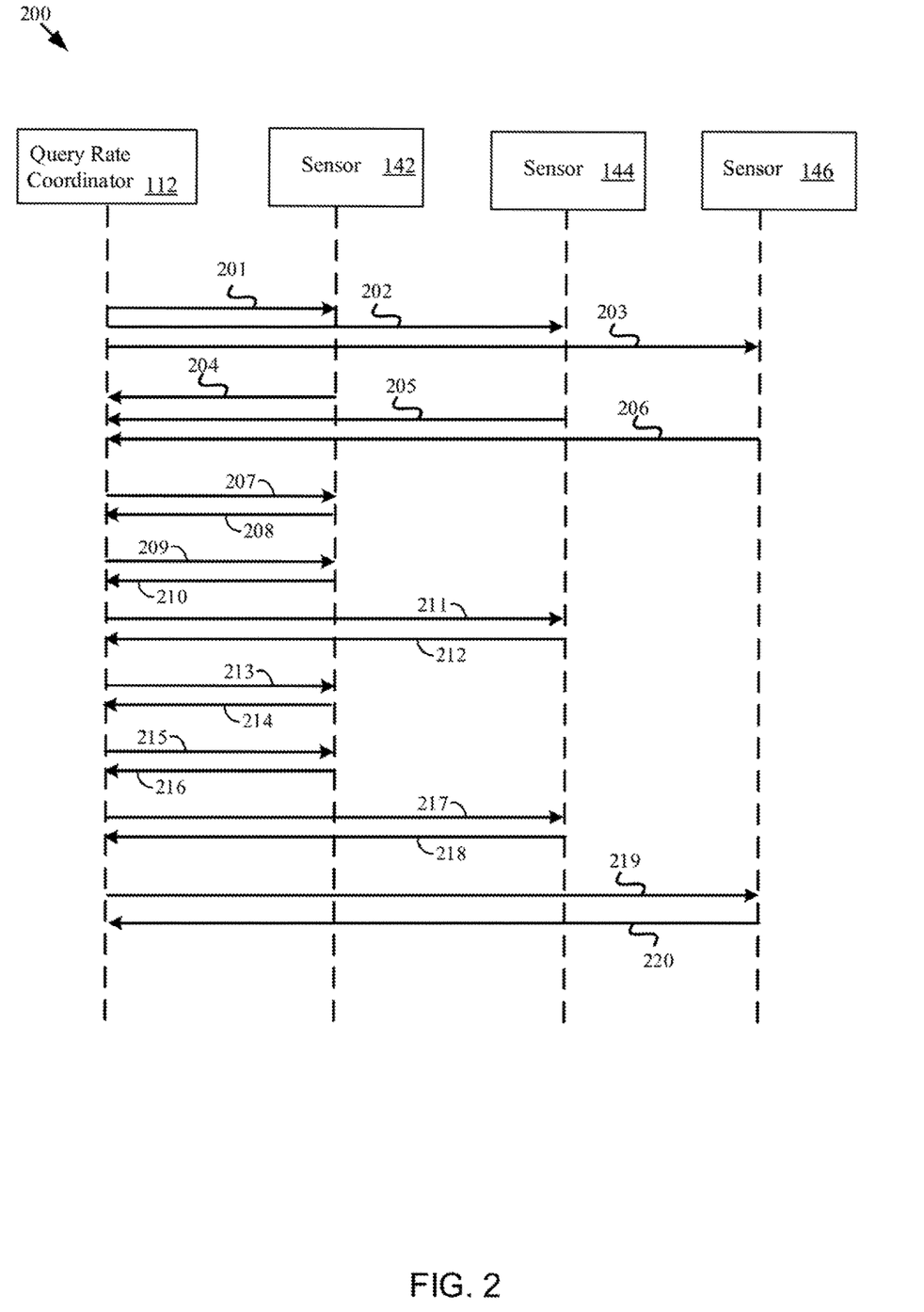
FIG. 2 is a signal diagram that illustrates an example sequence of queries and responses that result when a query rate coordinator applies techniques for determining query rates described herein using example sensor readings.

FIG. 2 is a signal diagram 200 that illustrates an example sequence of queries and responses that result when the query rate coordinator 112 applies techniques for determining query rates described herein using example sensor readings.

In this example, suppose the query rate coordinator 112 queries sensor 142 at arrow 201, sensor 144 at arrow 202, and sensor 146 at arrow 203. Furthermore, suppose the queries represented by arrows 201-203 are sent in rapid succession (e.g., within a few milliseconds of each other.)

Next, suppose the sensor 142 sends a current sensor reading measured at the sensor 142 to the query rate coordinator 112 at arrow 204 in response to the query that was sent at arrow 201. Similarly, suppose the sensor 144 sends a current sensor reading measured at the sensor 144 to the query rate coordinator 112 at arrow 205 in response to the query that was sent at arrow 202. Also, suppose the sensor 146 sends a current sensor reading measured at the sensor 146 to the query rate coordinator 112 at arrow 206 in response to the query that was sent at arrow 202.

For the purposes of this example, let value$_{min}$ equal 5 units (e.g., degrees Celsius, volts, amperes, or some other unit for quantities measured by the sensor 142), value$_{max}$ equal 25 units, $\Delta t_{min}$ equal 10 time units (e.g., seconds, milliseconds, hours, or some other unit that measures time), and $\Delta t_{max}$ equal 100 time units. (Persons of skill in the art will understand that these values are only illustrative and this disclosure is not limited thereby.)

Also, in this example, suppose the sensor reading reported by the sensor 142 at arrow 204 is 23.0 units, the sensor reading reported by the sensor 144 at arrow 205 is 18.7 units, and the sensor reading reported by the sensor 146 at arrow is 10.3 units. Using these sensor readings as parameter values for value$_{current}$, the query rate coordinator 112 determines that the value the time interval between the query that was sent to sensor 142 at arrow 201 and the next query to the sensor 142 (i.e., the value of $\Delta t_{extrapolated}$ for the sensor 142) will be about 19 time units. The query rate coordinator 112 also determines that the time interval between the query that was sent to the sensor 144 at arrow 202 and the next query to the sensor 144 will be about 38 time units. Similarly, the query rate coordinator 112 determines that the time interval between the query that was sent to the sensor 146 at arrow 203 and the next query to the sensor 146 is about 76 time units.

As a result, the query rate coordinator 112 queries the sensor 142 again at arrow 207 about 19 time units after the query at arrow 201 was sent. In response, the sensor 142 sends an updated sensor reading to the query rate coordinator 112 at arrow 208. If the updated sensor reading remains unchanged at 23.0 units, the query rate coordinator 112 again waits about 19 time units after the query at arrow 207 was sent before sending another query to the sensor 142 at arrow 209. Again, the sensor 142 responds at arrow 209 by sending an updated sensor reading. If the updated sensor reading remains unchanged at 23.0 units, the query rate coordinator 112 will wait another 19 time units before sending another query to the sensor 142.

In the meantime, upon detecting that 38 time units have elapsed since the query was sent to sensor 144 at arrow 202, the query rate coordinator 112 sends another query to the sensor 144 at arrow 211. In response, the sensor 144 sends an updated sensor reading to the query rate coordinator 112 at arrow 212. If the updated sensor reading remains unchanged at 18.7 units, the query rate coordinator 112 will wait about 38 time units after the query at arrow 211 was sent before sending another query to the sensor 144.

Next, upon detecting that 19 time units have elapsed since the query at arrow 209 was sent, the query rate coordinator 112 sends another query to the sensor 142 at arrow 213. In response, the sensor 142 sends an updated sensor reading to the query rate coordinator 112 at arrow 214. If the updated sensor reading remains unchanged at 23.0 units, the query rate coordinator 112 will wait another 19 time units after the query at arrow 213 was sent before sending another query to the sensor 142.

Upon detecting that 19 time units have elapsed since the query at arrow 213 was sent, the query rate coordinator 112 sends another query to the sensor 142 at arrow 215. In response, the sensor 142 sends an updated sensor reading to the query rate coordinator 112 at arrow 216. If the updated sensor reading remains unchanged at 23.0 units, the query rate coordinator 112 will wait another 19 time units after the query at arrow 215 was sent before sending another query to the sensor 142.

Next, upon detecting that 38 time units have elapsed since the query was sent to sensor 144 at arrow 211, the query rate coordinator 112 sends another query to the sensor 144 at arrow 217. In response, the sensor 144 sends an updated sensor reading to the query rate coordinator 112 at arrow 218. If the updated sensor reading remains unchanged at 18.7 units, the query rate coordinator 112 will wait about 38 time units after the query at arrow 217 was sent before sending another query to the sensor 144.

When the query rate coordinator 112 detects that 76 time units have elapsed since the query at arrow 203 was sent to sensor 146, the query rate coordinator 112 sends another query to the sensor 146 at arrow 219. In response, the sensor 146 sends an updated sensor reading to the query rate coordinator 112 at arrow 220.

Figure 3:
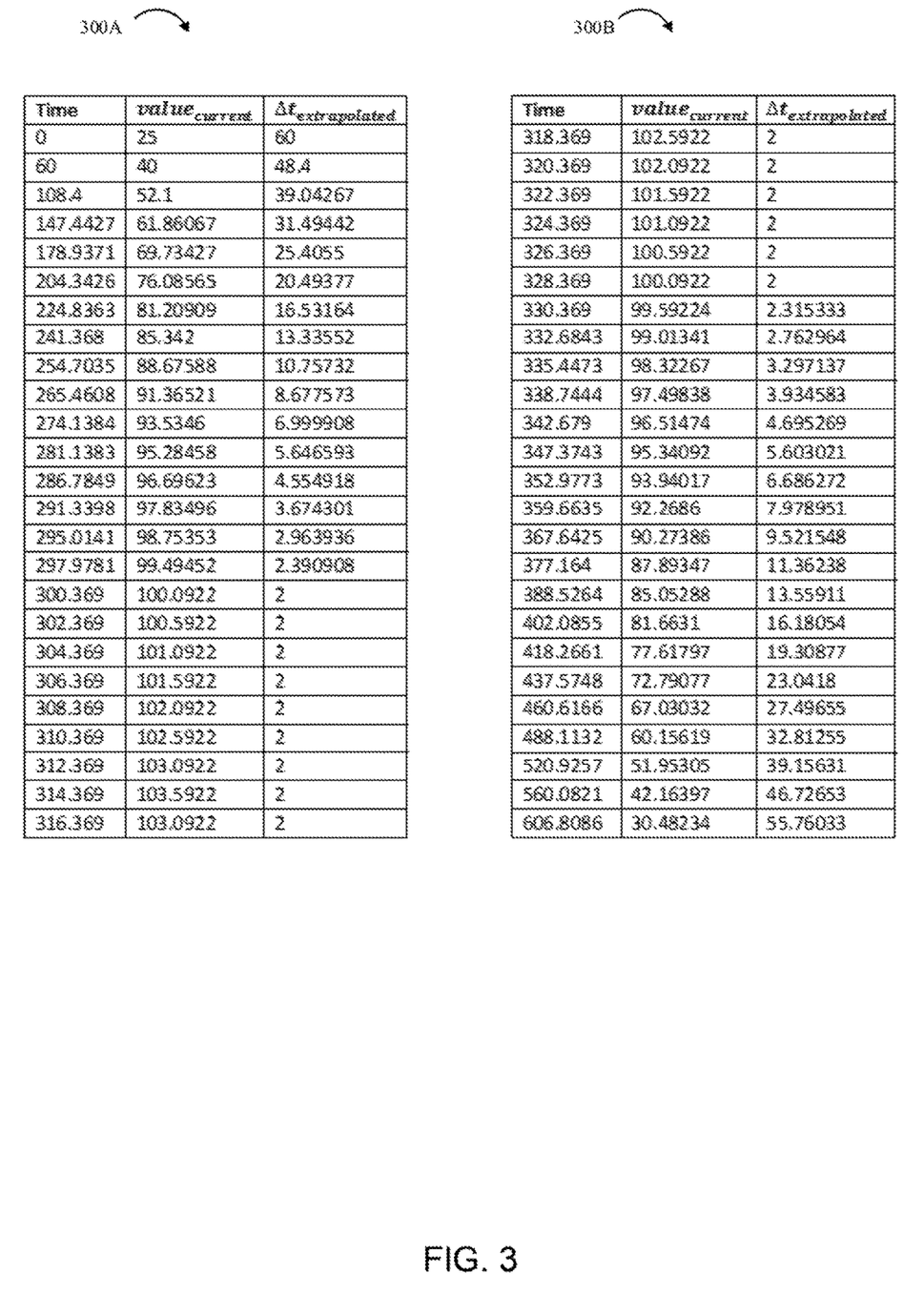
FIG. 3 shows tables that illustrate how the time interval between queries to a sensor may be adjusted, according to one example.
Figure 4:
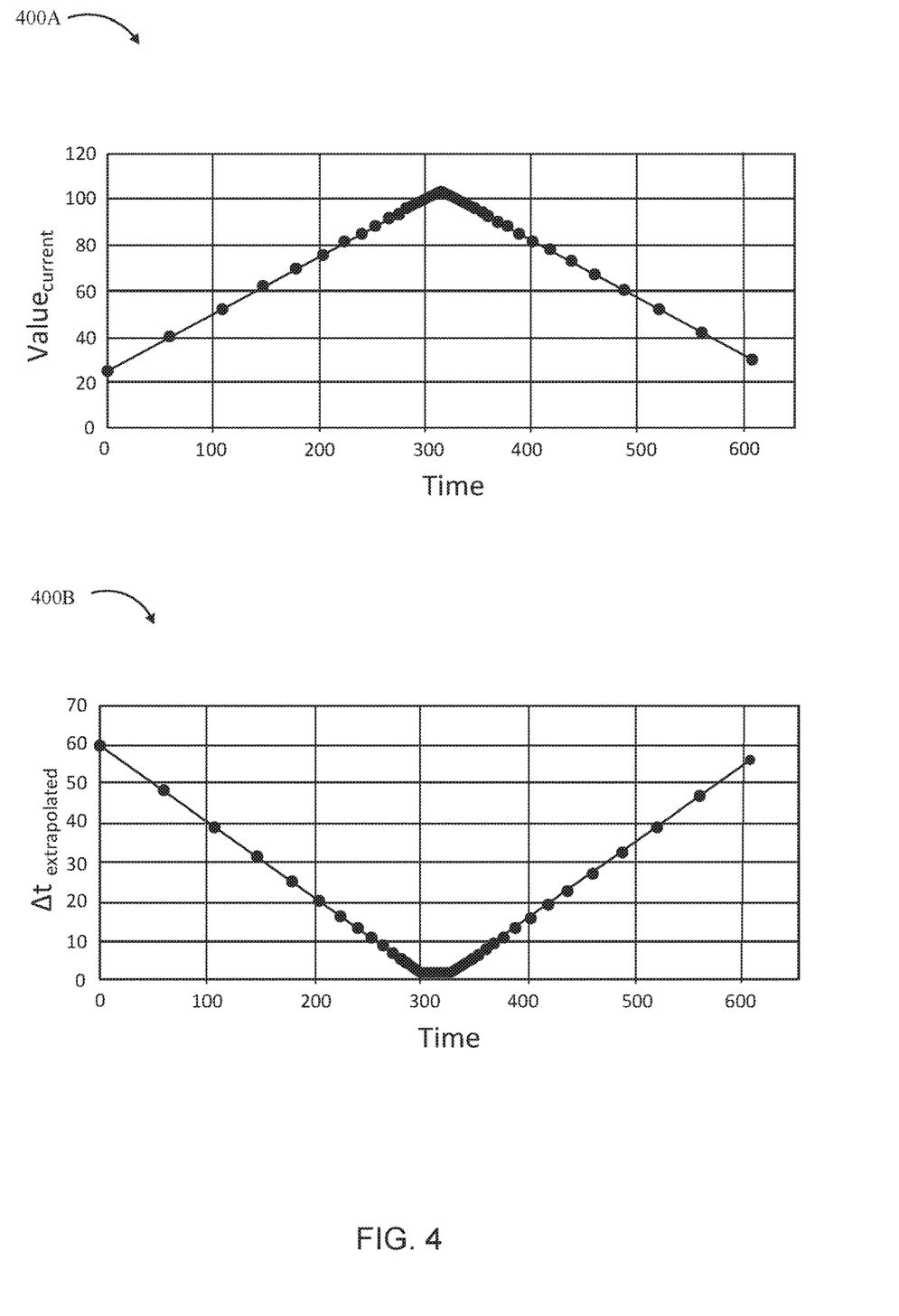
FIG. 4 is a graphical representation of the information presented in the tables shown in FIG. 3.

Thus, in this example, the query rate coordinator 112 queries the sensor 142, the sensor 144, and the sensor 146 at different rates based on the sensor readings. This example illustrates a scenario in which the values of sensor readings are relatively constant for each sensor for the duration of the signal diagram 200 so that the difference in the query rates for the different sensors is easy to discern. However, in many practical scenarios, successive sensor-reading values reported by a sensor will vary. FIGS. 3-4 illustrate how the query rate for a sensor may be dynamically adjusted as the sensor readings reported by the sensor change over time.

FIG. 3 shows tables that illustrate how the time interval between queries to a sensor may be adjusted, according to one example. For the purposes of this example, let value$_{min}$ equal 25 units (e.g., degrees Celsius, volts, amperes, or some other unit for quantities measured by the sensor 142), let value$_{max}$ equal 100 units, let $\Delta t_{min}$ equal 2 time units (e.g., seconds, milliseconds, hours, or some other unit that measures time), and let $\Delta t_{max}$ equal 60 time units. (Persons of skill in the art will understand that these values are only illustrative and this disclosure is not limited thereby.)

Table 300A shows sensor readings (the column labeled with the header "value$_{current}$") received in response to queries sent to a sensor at a sequence of points in time (the column labeled with the header "Time"). The time intervals between those queries are shown in the column labeled with the header "$\Delta t_{extrapolated}$." For each row, the time interval is calculated by applying the equation above using the sensor reading in that row. Table 300B is an extension of table 300A.

As shown, when the value in the "Time" column is zero, the sensor reading equals the value$_{min}$ for this example. As a result, a query rate coordinator sets the time interval ($\Delta t_{extrapolated}$) for the sensor that reports this reading equal to the $\Delta t_{max}$ (60 time units) for this example. Sixty time units later, at the row with "60" in the "Time" column, the sensor reading has changed to 40 units. In response to the change, the query rate coordinator updates the time interval for the sensor to 48.4 time units. After the updated time interval (48.4 time unit) elapses, another query is sent to the sensor. The sensor reading received in response to the query is 52.1 units, so the query rate coordinator updates the time interval to about 39 time units. Similarly, at each successive point in time specified in the column labeled "Time," the query rate coordinator recalculates the time interval from the current query to the next query based on the current sensor reading reported by the sensor.

FIG. 4 is a graphical representation of the information presented in table 300A and table 300B. Specifically, graph 400A shows the values of the sensor readings plotted against time. Graph 400B shows the time interval values that were calculated based on the sensor readings plotted against time. As shown, there is generally an inverse relationship between the values of the sensor readings and the lengths of the time intervals. However, the time intervals bottom out at 2 time units (the value of $\Delta t_{min}$) even when the sensor readings exceed 100 units (the value of value$_{max}$).

Figure 5:
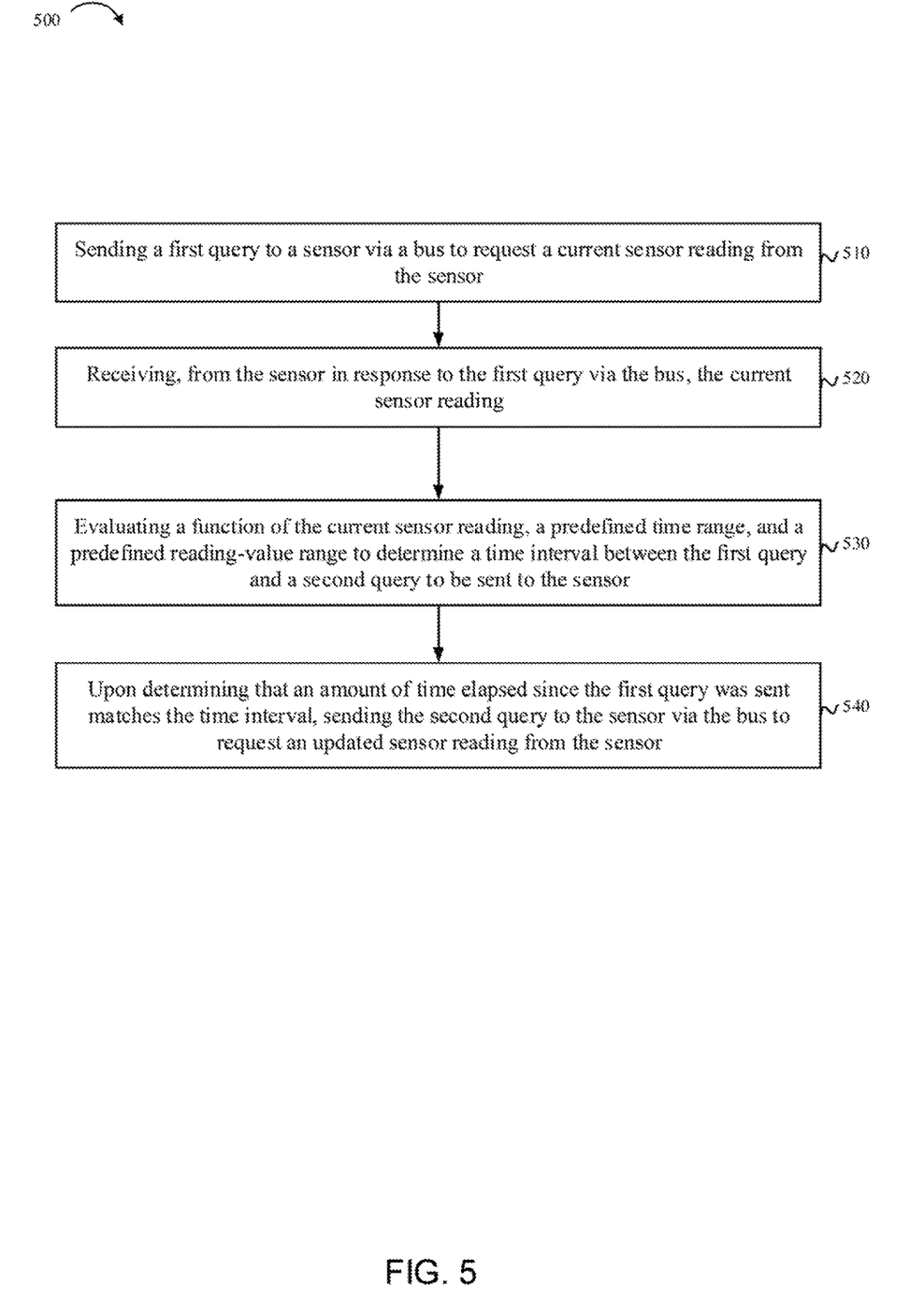
FIG. 5 illustrates functionality for a query rate coordinator as described herein, according to one example.

FIG. 5 illustrates functionality 500 for a query rate coordinator as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only six blocks are shown in the functionality 500, the functionality 500 may include other actions described herein. Also, some of the blocks shown in the functionality 500 may be omitted without departing from the spirit and scope of this disclosure.

As shown in block 510, the functionality 500 includes sending a first query to a sensor via a bus to request a current sensor reading from the sensor. In some examples, the functionality 500 may also include, before sending the first query, determining that a current position of the sensor in a list of sensors that share the bus indicates that the sensor is due to be queried. The sensors are sorted in the list in order of when the sensors are to be queried next.

As shown in block 520, the functionality 500 includes receiving, from the sensor in response to the first query via the bus, the current sensor reading.

As shown in block 530, the functionality 500 includes evaluating a function of the current sensor reading, a predefined time range, and a predefined reading-value range to determine a time interval between the first query and a second query to be sent to the sensor. The functionality 500 may also include, after determining the time interval, determining an updated position for the sensor in the list based on the time interval and based on when the first query was sent.

As shown in block 540, the functionality 500 includes, upon determining that an amount of time elapsed since the first query was sent matches the time interval, sending a second query to the sensor via the bus to request an updated sensor reading from the sensor. The functionality 500 may also include, before sending the second query, adding the sensor to the updated position in the list.

Figure 6:
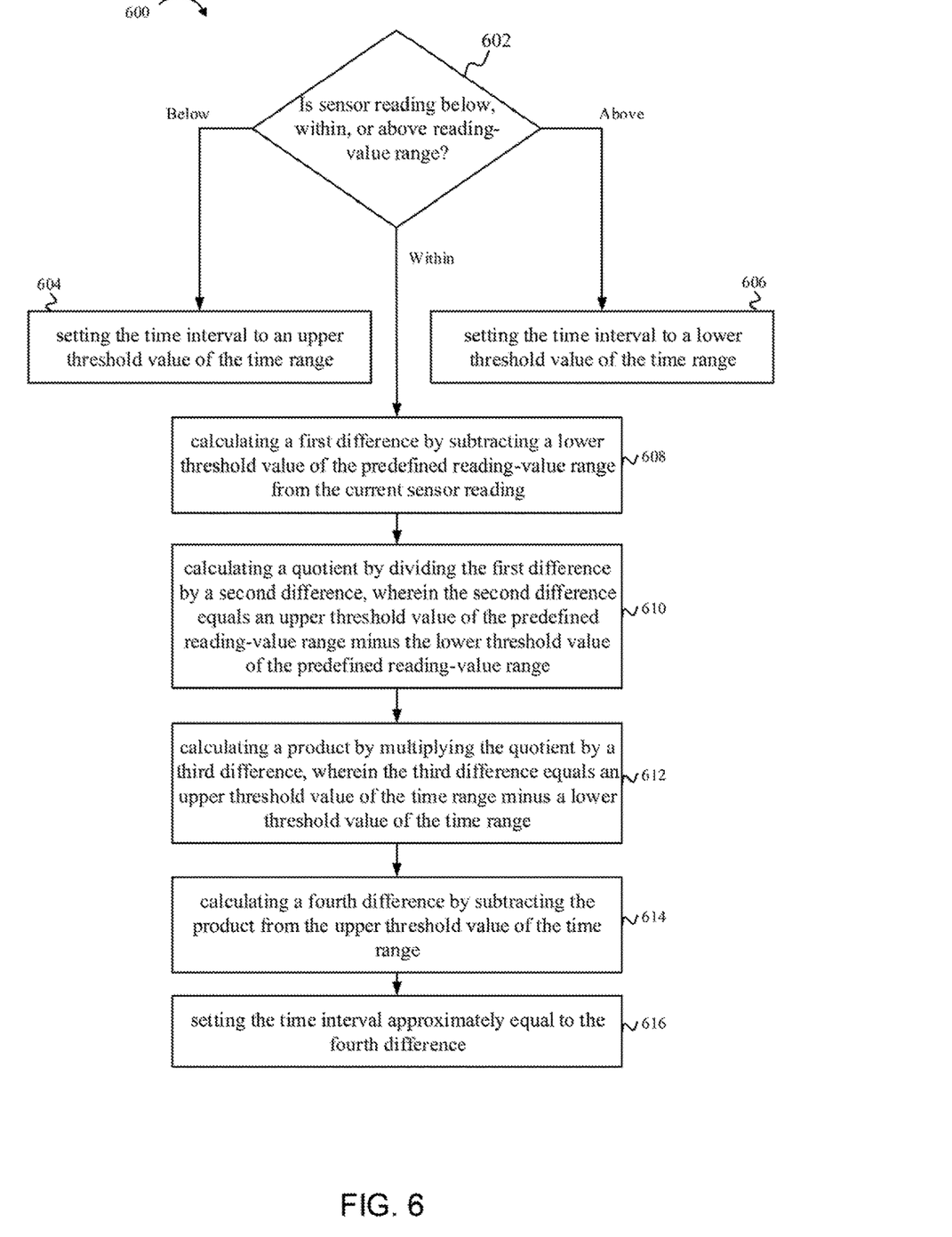
FIG. 6 illustrates additional functionality for a query rate coordinator as described herein, according to one example.

FIG. 6 illustrates additional functionality 600 for a query rate coordinator as described herein, according to one example. Specifically, the functionality 600 provides one example of a function that may be evaluated in block 530 of FIG. 5 to determine the time interval based on the current sensor reading, the predefined time range, and the predefined reading-value range. The functionality 600 may be implemented as a method or can be executed as instructions on a machine (e.g., by one or more processors), where the instructions are included on at least one computer-readable storage medium (e.g., a transitory or non-transitory computer-readable storage medium). While only eight blocks are shown in the functionality 600, the functionality 600 may include other actions described herein. Also, some of the blocks shown in the functionality 600 may be omitted or executed in a different order without departing from the spirit and scope of this disclosure.

As shown in block 602, the functionality 600 may include determining whether the current sensor reading is within, below, or above the predefined reading-value range.

As shown in block 604, if the current sensor reading falls below the predefined reading-value range, the functionality 600 may include setting the time interval to an upper threshold value of the time range. In one example, the sensor may be a thermal sensor and the functionality 600 may also include adjusting a speed of a fan associated with the sensor upon determining that the current sensor reading is less than the lower threshold value.

As shown in block 606, if the current sensor reading is above the predefined reading-value range, the functionality 600 may include setting the time interval to a lower threshold value of the time range. In one example, the sensor may be a thermal sensor and the functionality 600 may also include initiating a shut-down of a central processing unit (CPU) associated with the sensor upon determining that the current sensor reading exceeds the upper threshold value.

Blocks 608-616 are a branch illustrating several blocks that are included in the functionality 600 if the sensor reading falls within the predefined reading-value range.

Specifically, as shown in block 608, the functionality 600 includes calculating a first difference by subtracting a lower threshold value of the predefined reading-value range from the current sensor reading.

As shown in block 610, the functionality 600 includes calculating a quotient by dividing the first difference by a second difference, wherein the second difference equals an upper threshold value of the predefined reading-value range minus the lower threshold value of the predefined reading-value range.

As shown in block 612, the functionality 600 includes calculating a product by multiplying the quotient by a third difference, wherein the third difference equals an upper threshold value of the time range minus a lower threshold value of the time range.

As shown in block 614, the functionality 600 includes calculating a fourth difference by subtracting the product from the upper threshold value of the time range.

As shown in block 616, the functionality 600 includes setting the time interval approximately equal to the fourth difference.

While the present techniques may be susceptible to various modifications and alternative forms, the embodiments discussed above have been provided only as examples. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
sending a first query to a sensor via a bus to request a current sensor reading from the sensor;
receiving, from the sensor in response to the first query via the bus, the current sensor reading;
evaluating a function of the current sensor reading, a predefined time range, and a predefined reading-value range to determine a time interval between the first query and a second query to be sent to the sensor, wherein evaluating the function of the current sensor reading, the predefined time range, and the predefined reading-value range to determine the time interval comprises:
determining that the current sensor reading falls within the predefined reading-value range, calculating a first difference by subtracting a lower threshold value of the predefined reading-value range from the current sensor reading, calculating a quotient by dividing the first difference by a second difference, wherein the second difference equals an upper threshold value of the predefined reading-value range minus the lower threshold value of the predefined reading-value range, calculating a product by multiplying the quotient by a third difference, wherein the third difference equals an upper threshold value of the time range minus a lower threshold value of the time range, calculating a fourth difference by subtracting the product from the upper threshold value of the time range, and setting the time interval approximately equal to the fourth difference; and upon determining that an amount of time elapsed since the first query was sent matches the time interval, sending the second query to the sensor via the bus to request an updated sensor reading from the sensor.

2. The method of claim 1, further comprising:

before sending the first query, determining that a current position of the sensor in a list of sensors that share the bus indicates that the sensor is due to be queried, wherein the sensors are sorted in the list in order of when the sensors are to be queried next;

after determining the time interval, determining an updated position for the sensor in the list based on the time interval and based on when the first query was sent; and before sending the second query, adding the sensor to the updated position in the list.

3. The method of claim 1, wherein evaluating the function of the current sensor reading, the predefined time range, and the predefined reading-value range to determine the time interval comprises:

determining that the current sensor reading exceeds an upper threshold value of the reading-value range; and setting the time interval to a lower threshold value of the time range.

4. The method of claim 3, wherein the sensor is a thermal sensor, and wherein the method further comprises initiating a shut-down of a central processing unit (CPU) associated with the sensor upon determining that the current sensor reading exceeds the upper threshold value.

5. The method of claim 1, wherein evaluating the function of the current sensor reading, the predefined time range, and the predefined reading-value range to determine the time interval comprises:

determining that the current sensor reading is less than a lower threshold value of the reading-value range; and setting the time interval to an upper threshold value of the time range.

6. The method of claim 5, wherein the sensor is a thermal sensor, and wherein the method further comprises adjusting a speed of a fan associated with the sensor upon determining that the current sensor reading is less than the lower threshold value.

7. A system comprising:

one or more processors; and a memory storing instructions that, when executed on the one or more processors, perform a set of actions, the set of actions comprising:

sending a first query to a sensor via a bus to request a current sensor reading from the sensor;

receiving, from the sensor in response to the first query via the bus, the current sensor reading;

evaluating a function of the current sensor reading, a predefined time range, and a predefined reading-value range to determine a time interval between the first query and a second query to be sent to the sensor, wherein evaluating the function of the current sensor reading, the predefined time range, and the predefined reading-value range to determine the time interval comprises:

determining that the current sensor reading falls within the predefined reading-value range, calculating a first difference by subtracting a lower threshold value of the predefined reading-value range from the current sensor reading, calculating a quotient by dividing the first difference by a second difference, wherein the second difference equals an upper threshold value of the predefined reading-value range minus the lower threshold value of the predefined reading-value range, calculating a product by multiplying the quotient by a third difference, wherein the third difference equals an upper threshold value of the time range minus a lower threshold value of the time range, calculating a fourth difference by subtracting the product from the upper threshold value of the time range, and setting the time interval approximately equal to the fourth difference; and upon determining that an amount of time elapsed since the first query was sent matches the time interval, sending the second query to the sensor via the bus to request an updated sensor reading from the sensor.

8. The system of claim 7, wherein the set of actions further comprises:

before sending the first query, determining that a current position of the sensor in a list of sensors that share the bus indicates that the sensor is due to be queried, wherein the sensors are sorted in the list in order of when the sensors are to be queried next;

after determining the time interval, determining an updated position for the sensor in the list based on the time interval and based on when the first query was sent; and before sending the second query, adding the sensor to the updated position in the list.

9. The system of claim 7, wherein evaluating the function of the current sensor reading, the predefined time range, and the predefined reading-value range to determine the time interval comprises:

determining that the current sensor reading exceeds an upper threshold value of the reading-value range; and setting the time interval to a lower threshold value of the time range.

10. The system of claim 9, wherein the sensor is a thermal sensor, and wherein the method further comprises initiating a shut-down of a central processing unit (CPU) associated with the sensor upon determining that the current sensor reading exceeds the upper threshold value.

11. The system of claim 7, wherein evaluating the function of the current sensor reading, the predefined time range, and the predefined reading-value range to determine the time interval comprises:

determining that the current sensor reading is less than a lower threshold value of the reading-value range; and setting the time interval to an upper threshold value of the time range.

12. The system of claim 11, wherein the sensor is a thermal sensor, and wherein the method further comprises adjusting a speed of a fan associated with the sensor upon determining that the current sensor reading is less than the lower threshold value.

13. A non-transitory computer-readable storage medium containing instructions thereon that, when executed on a processor, perform the following:
sending a first query to a sensor via a bus to request a current sensor reading from the sensor;
receiving, from the sensor in response to the first query via the bus, the current sensor reading;
evaluating a function of the current sensor reading, a predefined time range, and a predefined reading-value range to determine a time interval between the first query and a second query to be sent to the sensor, wherein evaluating the function of the current sensor reading, the predefined time range, and the predefined reading-value range to determine the time interval comprises:
determining that the current sensor reading falls within the predefined reading-value range,
calculating a first difference by subtracting a lower threshold value of the predefined reading-value range from the current sensor reading,
calculating a quotient by dividing the first difference by a second difference, wherein the second difference equals an upper threshold value of the predefined reading-value range minus the lower threshold value of the predefined reading-value range,
calculating a product by multiplying the quotient by a third difference, wherein the third difference equals an upper threshold value of the time range minus a lower threshold value of the time range,
calculating a fourth difference by subtracting the product from the upper threshold value of the time range, and
setting the time interval approximately equal to the fourth difference; and
upon determining that an amount of time elapsed since the first query was sent matches the time interval, sending the second query to the sensor via the bus to request an updated sensor reading from the sensor.

14. The non-transitory computer-readable storage medium of claim 13, wherein the set of actions further comprises:
before sending the first query, determining that a current position of the sensor in a list of sensors that share the bus indicates that the sensor is due to be queried, wherein the sensors are sorted in the list in order of when the sensors are to be queried next;
after determining the time interval, determining an updated position for the sensor in the list based on the time interval and based on when the first query was sent; and
before sending the second query, adding the sensor to the updated position in the list.

15. The non-transitory computer-readable storage medium of claim 13, wherein evaluating the function of the current sensor reading, the predefined time range, and the predefined reading-value range to determine the time interval comprises:
determining that the current sensor reading exceeds an upper threshold value of the reading-value range; and
setting the time interval to a lower threshold value of the time range.

16. The non-transitory computer-readable storage medium of claim 15, wherein the sensor is a thermal sensor, and wherein the method further comprises initiating a shutdown of a central processing unit (CPU) associated with the sensor upon determining that the current sensor reading exceeds the upper threshold value.

17. The non-transitory computer-readable storage medium of claim 13, wherein evaluating the function of the current sensor reading, the predefined time range, and the predefined reading-value range to determine the time interval comprises:
determining that the current sensor reading is less than a lower threshold value of the reading-value range; and
setting the time interval to an upper threshold value of the time range.

* * * * *